(No Model.)

A. NORMAND.
FEED WATER HEATER.

No. 499,567. Patented June 13, 1893.

Witnesses

Inventor

UNITED STATES PATENT OFFICE.

AUGUSTIN NORMAND, OF HAVRE, FRANCE.

FEED-WATER HEATER.

SPECIFICATION forming part of Letters Patent No. 499,567, dated June 13, 1893.

Application filed June 25, 1892. Serial No. 437,986. (No model.)

*To all whom it may concern:*

Be it known that I, AUGUSTIN NORMAND, a citizen of France, and a resident of Havre, in the Department of the Seine-Inférieure, France, have invented a new and useful Improvement in Feed-Water Heaters, of which the following is a specification.

This invention relates to feed water heaters in which the water is heated under pressure in its passage between the feed pump and the boiler the heat being derived either from the steam or from the gaseous products of combustion. The transference of heat to water which is a poor conductor is rapidly augmented or accelerated by agitating the water. In surface heaters in which the water passes in the interior of the tubes it is consequently advantageous to provide obstacles in the passage of the water so as to agitate the latter. Other things being equal the agitation and consequently the transference of heat augment in proportion to the rapidity with which the water flows through the tubes. In order to agitate the water and accelerate its speed in surface heaters the apparatus according to this invention is arranged as hereinafter described. In each tube of the heater there are placed obstacles or baffles for the purpose of producing disturbance or agitation of the water. These obstacles may be formed by plates forming helices or bent or folded so as to obstruct or deflect the stream of water or by wires provided with rods or plates arranged at right angles to the direction of their length or concentric metallic or other rods preferably having roughened surfaces. Any other suitable arrangement capable of producing a disturbance or agitation of the water may be employed. For example tubes with longitudinal ribs such as the service tubes may be employed in the improved heater or tubes that are simply undulated or corrugated so as to present contractions and enlargements.

In order that the said invention may be fully understood I shall now proceed more particularly to describe the same and for that purpose shall refer to the annexed sheets of drawings in which the same letters of reference indicate corresponding parts in all the figures.

Figure 1:
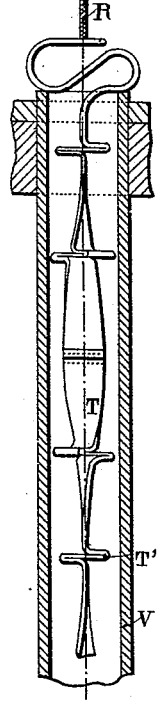
Figure 3:
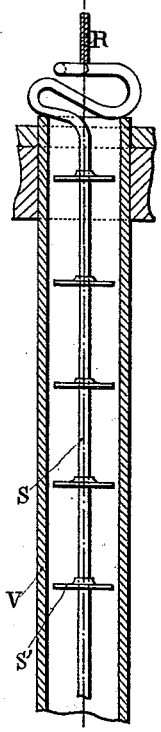
Figure 5:
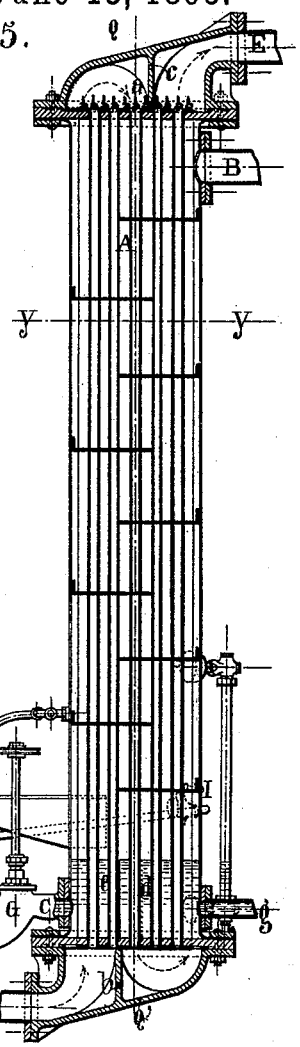
Figure 2:
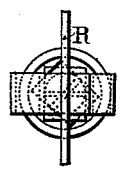
Figure 6:
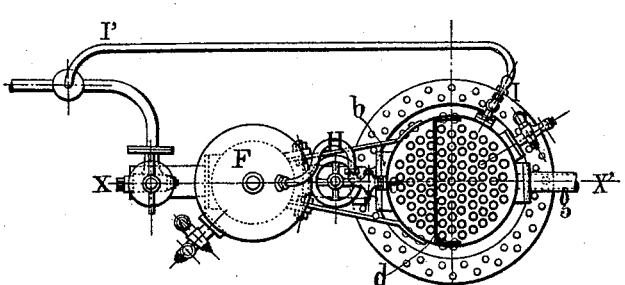

Figure 1 of the accompanying drawings represents in longitudinal or vertical section a feed water heater tube provided with baffling arrangements according to this invention and Fig. 2 represents the tube in plan. Fig. 3 represents a modified arrangement of the tube in vertical or longitudinal section this arrangement being represented in plan in Fig. 4. Fig. 5 represents in vertical section (on the line X X' Fig. 6) a feed water heater apparatus constructed according to this invention and Fig. 6 represents the same partly in plan and partly in horizontal section on the line Y Y' Fig. 5.

According to the arrangement illustrated in Figs. 1 and 2 the disturbance or agitation of the water flowing through the heater tube V is produced by means of a plate T twisted in the form of a helix and bent or folded at intervals as indicated at T' Fig. 1 in order to baffle or impede the flow of the water.

Figure 4:
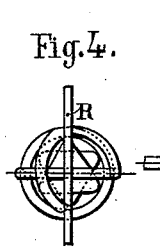

In the arrangement illustrated in Figs. 2 and 3 the heater tube V is provided with a straight central wire or rod S to which are attached at suitable distances (say from about one to two and a half inches apart for example), thin plates S' cut to a figure contained within the internal diameter of the tube as represented in Fig. 4 so as to leave contracted passages for the water at the edges of the plates. The angles of these plates are arranged in different planes not being in the same generating lines of the tube (Fig. 4) so as to more effectually break up or deflect the streams of water flowing through the passages formed between the said angles. It is preferred to employ iron instead of copper for the central rods S the conductivity of the former metal being less and its rigidity greater than that of copper. The apparatus employed to produce the agitation in each tube is not designed to impart a more or less uniform mean temperature to the water but enables the water to become gradually heated and to issue from the heating tube at a temperature as near as possible to that of the steam outside the said tube. The central wires S are bent at the upper ends in the form of an S as represented in the drawings (Figs. 1 and 3, in order to enable them to be secured in position by plates R attached to the cover and bearing on the flexible or springy end of the wire (Fig. 3). A similar arrangement is employed in the case of the bent plate or strip T employed in the arrangement illustrated in Fig. 1. The wires S provided with the diaphragm or baffle plates S' being introduced into the vertical tubes V from the upper end it is simply necessary to remove the cover of that part of the heater in order to enable the wires and plates to be removed and to clean the tubes. As hereinbefore explained the agitation of the water is greater in proportion as its speed it increased irrespective of the kind of device or arrangement employed to produce the agitation.

In order to increase the speed or rate of flow of the water, it is sufficient to diminish the sectional area of the passage. This result is obtained by making the heater as long as possible by combining a number of heaters together or more simply by dividing a series or set of tubes into several parts presenting approximately equal heating areas of surface and causing the water to pass through all the said parts in succession. This arrangement is illustrated in Figs. 5 and 6 of the drawings. In these figures A is a surface feed water heater arranged according to this invention. The steam taken from a lower intermediate chamber enters the apparatus at B and escapes at C after condensation on the external surfaces of the tubes. The feed water from the feed pump enters the lower end of the heater at D, flows up in a series of tubes on one side of the apparatus, then descends in a series of intermediate tubes and reascends in a third series of tubes on the other side as indicated by the arrows in Fig. 5, being finally discharged from the upper end of the heater into a pipe E leading to the boiler.

F is a trap or blow off apparatus for the discharge of the water of condensation communicating with the heater at the lower part through a valve G provided for the purpose of enabling the blow off apparatus to be examined without stopping the heater and connected at the upper part through a pipe H likewise provided with a valve or stop cock. An equilibrium of pressure is thus enabled to be established between the heater A and the blow off apparatus F the level of the water in the latter being practically the same as in the heater A provided that the valve is of suitable diameter.

A valve I communicating with the outlet through a branch pipe I' is provided for the purpose of drawing off any excess of air that may have accumulated in the heater and is placed as low down as possible.

The top plate or cover Q and the bottom plate Q' of the heater A are each provided with a diaphragm or partition marked respectively a and b Fig. 5, which divide the chambers formed in the said plates into two compartments and direct the water in such a manner as to cause it to circulate in the tubes three times as hereinbefore explained. The tube plates are rigid and the partitions a and b fit as closely as possible against the surfaces of these plates between the tubes so as to limit the number of tubes to which the water in each compartment of the cover has access. The elasticity necessary to allow for expansion and contraction is obtained by means of the outer flanges and if necessary by a corrugation in the casing.

The air contained in the feed water and which is present in considerable quantity in surface condensing engines has a tendency to greatly retard the transmission of heat. In that part of the central or intermediate series of tubes in which the water circulates *per descensum* this air tends to accumulate in such a manner as to almost fill the tubes unless some provision is made for separating it from the water. With this object the partition a in the cover Q is perforated with a hole c Fig. 5 of about one twenty-fifth of an inch in diameter or of sufficient size to allow the air to escape from the first or inlet compartment of the cover into the second or outlet compartment under the influence of the slight difference in pressure which exists between the two compartments but which is insufficient to allow of any material escape of water. This hole may be situated at such a level as to provide for a small cushion of air in order to obviate concussion. By means of a similar arrangement the air may be expelled before it can enter the apparatus but the presence of air in the ascending current is of much less consequence.

A partition d Fig. 6 separates the space containing the lower part of the series of tubes, traversed by the water in the first instance, from the space containing the other tubes. The lower part of the space e on one side of this partition communicates at C with the automatic blow off or discharge apparatus F. The space on the other side of this partition is connected at g with the high pressure discharge or blow off from the condenser and with the discharge from the intermediate chambers of the condenser being other than the lower chamber. This water of condensation is partially evaporated and more or less rapidly acquires the temperature of saturation corresponding with the pressure of steam in the heater and as it is constantly renewed the lower ends of the tubes in the two last series traversed by the feed water are continually immersed in water at a very high temperature. The whole of this water along with that resulting from the condensation in the heater ultimately passes through the space e and is considerably cooled before it leaves the apparatus. In place of being divided into three parts the combination of tubes may be divided into two series only. The inlet and outlet of the feed water being arranged at the same end of the casing and preferably at the lower end. It is true that this arrangement has the effect of diminishing the speed of the water but it presents the advantage of necessitating only one partition (such as *a* or *b*) in the end or connecting chamber and the labor of remaking the rather troublesome joint between this partition and the upper tube plate every time that the top plate or cover is removed in order to examine and clean the interior of the apparatus is thus obviated.

When the question of saving fuel is of more importance than extra weight and first cost the temperature of the feed water may be further raised by providing a second or supplementary heater in which the heat is derived entirely from the water of condensation discharged at high pressure before it passes into the main heater.

It will be readily understood that in the case of a triple expansion engine for example in which the live steam is supplied under a pressure of one hundred and seventy pounds per square inch (per square centimeter twelve kilos) and at a temperature of 191° centigrade the pressure and temperature in the heater supplied from the intermediate chamber of the condenser will not exceed twenty pounds (1.4 kilos) and 126° degrees respectively. The discharges from the small valve chest and from the steam jackets supplied with steam direct from the boiler also have a temperature of 191° and if the expansion is considerable will supply a sufficient quantity of water to make a substantial difference in the temperature of the feed water. Nevertheless this arrangement as already explained is not recommended except when economy of fuel is of extreme importance.

The invention has been described in connection with tubes fixed in plates at both ends but it is evident that other arrangements such as field tubes may be employed the water being supplied to the inner tube and being afterward heated by contact with the large tube. The speed of flow in this case is greater in proportion as the sectional area of the annular space between the tubes is contracted and the transference of heat is thus increased. This transference may be further promoted by forming a helix or screw thread upon the inner circulating tube and dividing the combination of tubes into several parts or series which are successively traversed by the water.

What I claim as my invention is—

In a feed water heater, the combination with several series of feed water heater tubes, a tube plate, and a cover having a partition separating adjacent series of tubes, of a number of baffles or deflectors arranged at intervals in each of said tubes and provided with a supporting rod having one end extended beyond the water heater tube and bent to form a flexible or yielding connection, and a plate attached to the cover and bearing on the flexible end of said rod, substantially as described.

In testimony whereof I have signed this specification in the presence of two subscribing witnesses.

AUGUSTIN NORMAND.

Witnesses:
CH. BIKLER,
F. FARNE.